United States Patent [19]

Leigh-Monstevens et al.

[11] Patent Number: 5,002,166

[45] Date of Patent: Mar. 26, 1991

[54] DUAL MODE MOTOR VEHICLE CLUTCH CONTROL SYSTEM

[75] Inventors: Keith V. Leigh-Monstevens, Troy; Leslie P. Branum, Sterling Heights, both of Mich.

[73] Assignee: Automotive Products plc, Warwickshire, England

[21] Appl. No.: 408,575

[22] Filed: Sep. 14, 1989

[51] Int. Cl.$^5$ .................... B60K 41/22; B60K 41/28; F16D 25/08; F16D 27/00
[52] U.S. Cl. .................................. 192/0.08; 60/567; 192/3.58; 192/3.62; 192/83
[58] Field of Search ............... 192/0.08, 3.62, 83, 192/3.58, 85 C, 91 R; 60/550, 566, 567

[56] References Cited

U.S. PATENT DOCUMENTS

| | | | |
|---|---|---|---|
| 2,458,803 | 1/1949 | Stelzer | 60/550 X |
| 3,292,751 | 12/1966 | McRay et al. | 192/83 X |
| 3,352,392 | 11/1967 | Black et al. | 192/83 X |
| 3,406,800 | 10/1968 | Buchanan et al. | 192/91 R |
| 3,435,929 | 4/1969 | Thompson | 192/83 X |
| 3,548,981 | 12/1970 | Hill et al. | 192/83 X |
| 3,921,773 | 11/1975 | Dietrich | 192/83 |
| 4,028,891 | 6/1977 | Belart | 60/550 |
| 4,172,364 | 10/1979 | Young | 60/550 |
| 4,280,604 | 7/1981 | Lambicco | 192/0.08 |
| 4,505,364 | 3/1985 | Goucher et al. | 192/83 X |
| 4,506,770 | 3/1985 | Schmid | 192/0.08 |
| 4,723,642 | 2/1988 | Grunberg et al. | 192/3.62 X |
| 4,745,999 | 5/1988 | Brugger et al. | 192/83 |
| 4,785,917 | 11/1988 | Tateno et al. | 192/0.08 |

FOREIGN PATENT DOCUMENTS

| | | |
|---|---|---|
| 2440039 | 7/1983 | Fed. Rep. of Germany . |
| 8702583 | 2/1987 | France . |
| 1459419 | 12/1976 | United Kingdom . |
| 2041481 | 9/1980 | United Kingdom . |

OTHER PUBLICATIONS

Bendix Hydro-Max Power Brake brochure (no date given).
Alfred Teves booster literature (no date given).
Automotive Products power hydraulic booster literature (no date given).

Primary Examiner—Rodney H. Bonck
Attorney, Agent, or Firm—Krass & Young

[57] ABSTRACT

A dual mode clutch control system for a motor vehicle in which the operator has the choice of operating the clutch manually or having the clutch operated in a power mode in response to movement of the gear shift lever. Two embodiments are disclosed. In both embodiments, a mode selector switch is provided which is movable between a manual mode and a power mode. In one embodiment, the power mode is provided by a master cylinder assembly in which the piston of the master cylinder is normally moved by an input rod connected to the clutch pedal but in which an annular pressure chamber is provided in communication with the piston to which pressurized fluid may be delivered from a pressure source when the mode selector switch is positioned in the power mode. The source of pressurized fluid may comprise a motor driving a pump and an accumulator for storing pressurized fluid from the pump. With the system in the power mode, pressurized fluid is delivered from the accumulator to the master cylinder in response to movement of the gear shift lever. In the other embodiment, the power mode of the system is provided by an electric motor including a ball screw assembly drivingly connected to the piston of a master cylinder and the manual operation of the clutch is provided by a pushrod connected to the clutch lever and passing through a central bore provided in the screw of the ball screw assembly for engagement with the piston.

33 Claims, 4 Drawing Sheets

DUAL MODE MOTOR VEHICLE CLUTCH CONTROL SYSTEM

BACKGROUND OF THE INVENTION

This invention relates to a motor vehicle clutch control system and more particularly to a motor vehicle clutch control system in which the operator may choose between a manual mode operation of the clutch and a power mode operation of the clutch.

Motor vehicles since their inception have required some manner of gear change mechanism to satisfy the varying torque and speed requirements encountered during the typical duty cycle of a motor vehicle. For many years these gear change mechanisms were manual in the sense that they required an operator input from a shift lever and operator operation of a clutch to effect each desired gear change ratio. More recently, so-called "automatic" transmissions have become popular in which much of the shifting is done without operator input in response to sensed speed and throttle opening parameters. These automatic transmissions, however, are typically relatively expensive and inherently involve a fuel economy penalty as compared to manual transmissions. They also take away much of the control of the vehicle from the driver. Various attempts have been made in the past to combine the low cost, superior fuel economy, and driver control aspects of a manual transmission with the convenience aspects of an automatic transmission. Specifically, various attempts have been made to provide automatic or semi-automatic shifting for manual transmissions including systems in which the driver may at his option choose as between fully manual or semi-automatic shifting. However, none of these prior art attempts to facilitate and simplify the shifting of a manual transmission have met with any degree of commercial success since they provided a slow or imprecise shifting action and/or have generated excessive warranty and maintenance costs.

SUMMARY OF THE INVENTION

This invention is directed to the provision of a control system for a manual transmission motor vehicle which provides a positive and precise clutching and declutching action, which is amenable to ready installation in the motor vehicle at the time of the original motor vehicle manufacture, and which is reliable in operation even over a long motor vehicle life.

More specifically, this invention is directed to the provision of an improved control system for a manual transmission motor vehicle in which the driver may choose, at his option, between manual operation of the clutch or automatic operation of the clutch.

The invention control system is intended for use with a motor vehicle of the type including a clutch, a clutch pedal, a manual gear box having a plurality of shift positions, and a gear shift assembly having a plurality of shift positions corresponding to the shift positions of the gear box. According to the invention, the control system includes manual mode means operative in response to operation of the clutch pedal to actuate the clutch; power mode means operative when enabled to actuate the clutch in response to movement of the gear shift assembly; control means operative to sense the position of the gear shift assembly and operative when enabled to enable the power mode means; and mode selector means movable by the vehicle operator between a first position in which the control means is enabled and a second position in which the control means is disenabled. This arrangement allows the operator at any given time to choose between manual operation of the clutch or automatic operation of the clutch.

According to a further feature of the invention, the control means is further operative to sense the initiation of a gear changing movement of the gear shift assembly and the system is operative with the mode selector means in its enabling position to disengage the clutch upon initiation of a gear changing movement of the gear shift assembly as sensed by the control means and to reengage the clutch upon the completion of the gear changing movement of the gear shift assembly as sensed by the control means. This arrangement provides positive disengagement and reengagement of the clutch upon the initiation and completion, respectively, of the gear shifting movement.

According to a further feature of the invention the control means comprises a logic module electrically connected to the gear shift assembly, to the mode selector member, and to the power mode means. This arrangement allows a readily available control logic module to perform the required sensing functions.

According to a further feature of the invention, the electrical connections of the logic module to the gear shift assembly include means for sensing the initiation of a gear shifting movement of the gear shift assembly and additional means operative to sense the completion of the movement of the gear shifter assembly. This specific arrangement facilitates the sensing of the initiation and completion of the gear shifting movement of the gear shift assembly and thereby facilitates the timing of the disengagement and reengagement of the clutch.

According to a further feature of the invention, the gear shift assembly includes a shift lever and a shift knob having a lost motion connection with the shift lever and the shift initiation sensing means includes means sensing a lost motion movement between the shift lever and the shifting knob occurring in response to initiation of a gear changing movement of the gear shift assembly.

According to a further feature of the invention, the manual mode means includes a master hydraulic cylinder assembly, including a cylinder housing defining an axially extending bore and a piston reciprocally movable in the bore in response to operation of the clutch pedal, and a slave cylinder assembly receiving the output of the master cylinder assembly and including an output member adapted to be connected to the clutch so as to be operative to engage and disengage the clutch in response to reciprocal movement of the piston in the bore of the master cylinder housing, and the power mode means includes means for moving the piston reciprocally in the bore of the master cylinder housing independently of the movement thereof in response to operation of the clutch pedal. This arrangement allows the known and reliable technology of a hydraulic master cylinder assembly to be employed to provide the dual mode operation of the clutch.

According to a further feature of the invention, the manual mode means includes a rod member adapted to be driven at one end thereof in response to operation of the clutch pedal and extending at its other end into the bore of the master cylinder housing for driving engagement with the piston. This arrangement provides a ready and efficient means of drivingly interconnecting the clutch pedal and the piston in the bore of the master cylinder housing.

According to a further feature of the invention, the piston includes a central blind bore at one end thereof and the other end of the rod member extends into the blind bore. This arrangement further facilitates the driving interconnection between the clutch pedal and the piston.

According to a further feature of the invention, the driving engagement of the rod member with the piston is a pushing engagement and the piston is free to move in the bore of the master cylinder housing away from the rod member in response to operator movement of the gear shift lever with the mode selector means in its enabling position. This arrangement allows the piston to be moved reciprocally in the bore of the master cylinder housing in response to operation of the clutch pedal and facilitates independent movement of the piston in the bore of the master cylinder housing in response to operation of the power mode means.

According to a feature of one embodiment of the invention, the power mode means includes a source of pressurized fluid and delivery means operative to deliver pressurized fluid from the source to the master cylinder assembly in response to movement of the shift lever with the mode selector means in its enabling position. This arrangement provides a convenient and effective means of moving the piston in the bore of the master cylinder housing independently of the operation of the clutch pedal.

According to a further feature of this embodiment of the invention, the source of pressurized fluid includes a motor, a pump driven by the motor, and an accumulator for storing pressurized fluid, and the delivery means includes valve means movable between open and closed positions in response to movement of the shift lever with the mode selector means in its enabling position. This arrangement provides a convenient means of delivering pressurized fluid to the bore of the master cylinder housing to facilitate the power operation of the clutch.

According to a further feature of this embodiment of the invention, the rod member of the manual mode means drivingly engages a central portion of the piston; the piston defines an annular surface in surrounding relation to the central portion engaged by the rod member; the hydraulic master cylinder assembly further defines an annular pressure chamber in communication with the annular piston surface; and the delivery means delivers pressurized fluid to the annular chamber for action against the annular piston surface. This arrangement provides an effective and convenient means of applying the pressurized fluid against the piston to effectuate the power operation of the piston and thereby the power operation of the clutch.

According to another feature of this embodiment of the invention, the hydraulic master cylinder assembly includes an annular member positioned within the bore of the master cylinder housing; the annular pressure chamber is defined between the outer periphery of the annular member and the inner periphery of the bore; the piston includes a blind axial bore opening at one end thereof and defining an annular piston portion slidably mounted at its inner periphery on the outer periphery of the annular member; and the piston annular surface is defined by the piston annular portion at one end of the piston. This arrangement provides an efficient means for mounting the piston within the bore of the master cylinder housing while providing ready access to the piston by the rod member of the manual mode means and the pressurized fluid of the power mode means.

According to a further feature of this embodiment of the invention, the rod member extends through the annular member of the hydraulic master cylinder assembly for engagement with the end of the blind bore. This arrangement further facilitates the dual mode movement of the piston within the bore of the cylinder housing.

According to a feature of a second embodiment of the invention, the power mode means includes an electric motor assembly including an electric motor and drive means drivingly connecting the motor to the piston in the bore of the master cylinder housing. This arrangement provides an inexpensive and efficient means of moving the piston under power in the bore of the master cylinder housing.

According to a further feature of this embodiment of the invention, the electric motor includes an annular armature and the drive means includes a nut driven by the armature and a screw driven by the nut. This nut and screw arrangement provides an efficient means of converting the rotary movement of the motor armature into axial movement for use in moving the piston reciprocally in the bore of the master cylinder housing.

According to a further feature of this embodiment of the invention, the motor assembly is mounted to the master cylinder housing with the central output axis of the motor coaxial with the axis of the bore of the master cylinder housing. This coaxial arrangement facilitates the positive operation of the power mode of the invention while further providing a convenient and efficient package for the overall assembly.

According to a further feature of this embodiment of the invention, the screw is annular, the manual mode means includes a rod member positioned at least in part within the screw, the rod member is adapted to be driven by the screw in response to energization of the electric motor and is adapted to be driven at one end thereof in response to operation of the clutch pedal, and the rod member extends at its other end into the bore of the cylinder housing for driving engagement with the piston. This arrangement provides a ready and efficient means of providing the dual mold operation of the assembly.

According to a further feature of this embodiment of the invention, the one end of the rod member is positioned within the screw and the manual mode means further includes a pushrod adapted to be connected at one end thereof to the clutch pedal and extending at its other end into the screw into juxtaposition with the one end of the rod member. This arrangement allows the screw to be advanced by the motor to provide the power movement of the piston and allows a pushrod from the clutch pedal to extend through the hollow screw to provide the manual movement of the piston.

DETAILED DESCRIPTION OF THE PREFERRED EMBODIMENTS

The invention dual mode clutch control system is intended for use with a motor vehicle of the type including a floorboard 10, a firewall 12, a clutch pedal 14 pivotally mounted at its upper end on a bracket 16 secured to firewall 12, an engine 18 including a throttle 20, a clutch 22 including a release bearing 24 and a release lever 26 pivotally mounted at its lower end within the housing 28 of the clutch, a clutch shaft 30, a manual gearbox 32 including a plurality of shift positions, and a gearshift lever 33 connected to the manual gearbox 32 and movable in known manner between a plurality of shift positions to selectively shift the gearbox between a plurality of shift positions.

Figure 1:
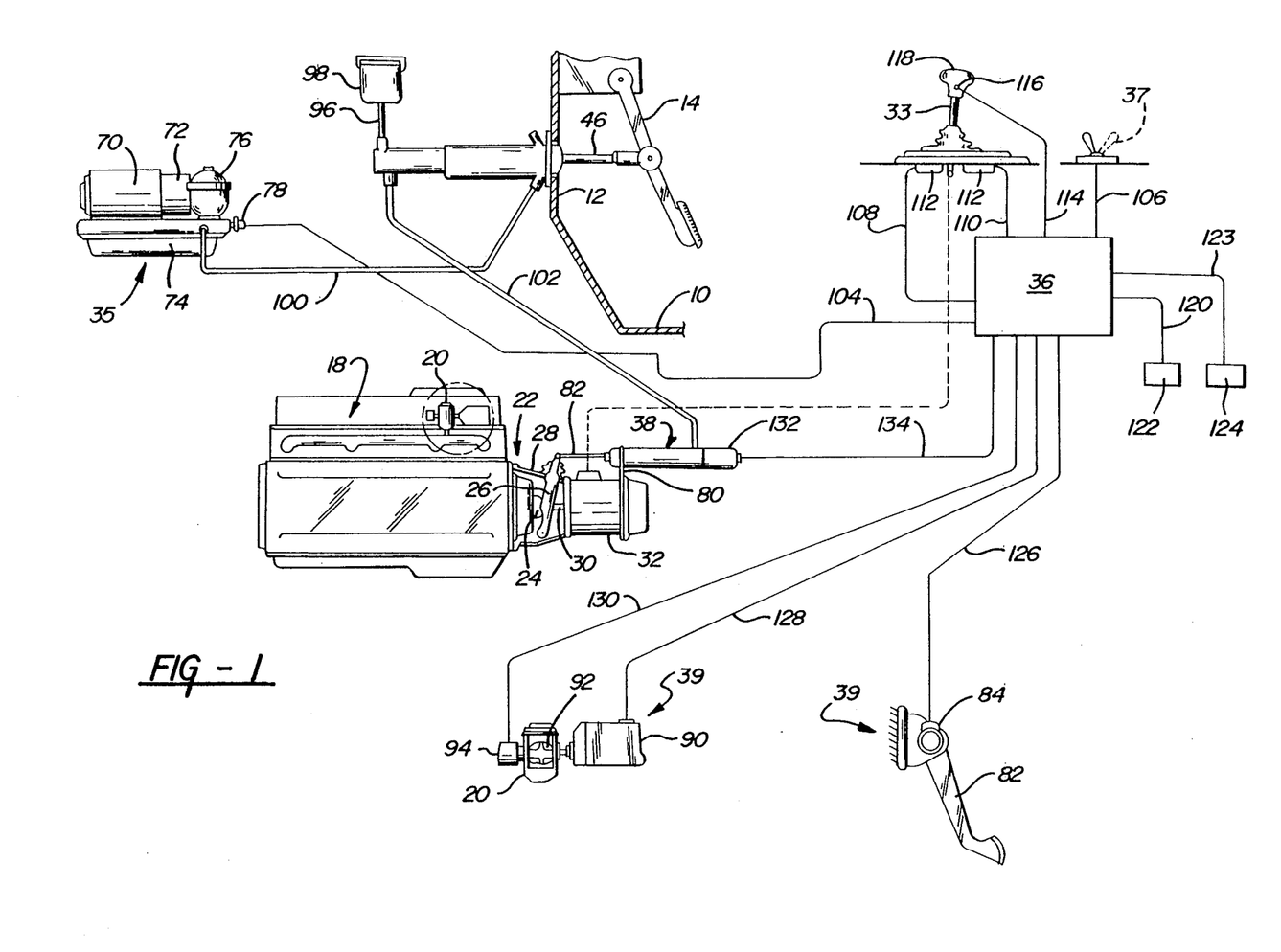
FIG. 1 is a schematic view of a first embodiment of the invention dual mode clutch control system.
Figure 2:
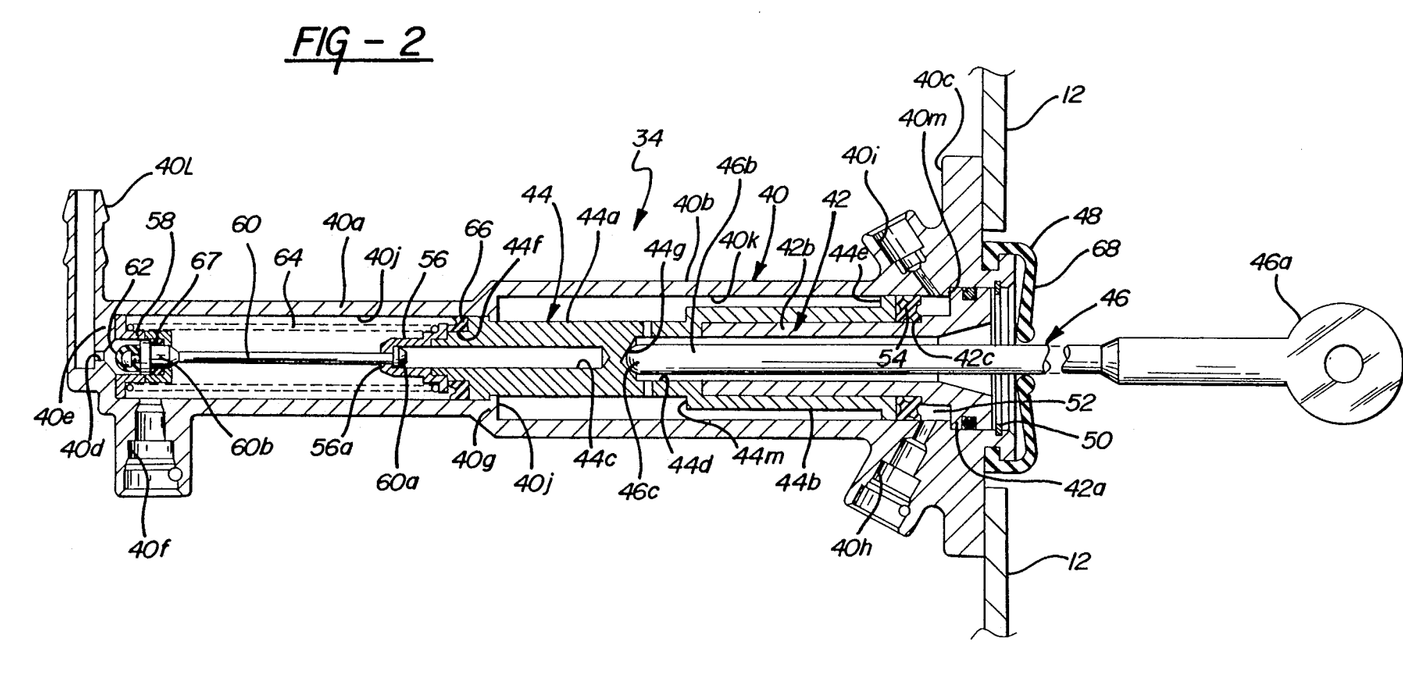
FIG. 2 is a detailed view of a hydraulic master cylinder assembly utilized in the system of FIG. 1.

The dual mode clutch control system of the FIGS. 1 and 2 embodiment, broadly considered, includes a master cylinder assembly 34, a power assembly 35, a control module 36, a mode selector switch 37, a slave cylinder 38, and a throttle control assembly 39.

Master cylinder assembly 34 includes a cylinder housing 40, an annular guide member 42, a piston 44, and a pushrod 46.

Housing 40 includes a small diameter forward portion 40a, a large diameter rearward portion 40b, and a flange portion 40c at the rear end of large diameter portion 40b. A reservoir port 40d is defined in the end wall 40e of reduced diameter forward portion 40a and a discharge port 40f is defined in the sidewall of reduced diameter portion 40a proximate the front end of the reduced diameter portion. An annular shoulder 40g is defined at the juncture of portions 40a and 40b, an inlet port 40h is provided in sidewall portion 40b proximate flange portion 40c, and a bleed port 40i is provided in opposed relation to inlet port 40h. Housing 40 defines a central axial bore including a small diameter forward bore portion 40j defined within forward housing portion 40a and a large diameter rearward bore portion 40k defined within housing portion 40b. Reservoir port 40d and discharge port 40f open in bore portion 40j and inlet portion 40h and bleed port 40i open in bore portion 40k.

Annular guide member 42 includes a rearward flange portion 42a and a main body tubular portion 42b. Guide member 42 is positioned within large bore portion 40k with flange portion 42a seated against a shoulder 40m defined proximate the rear end of the cylinder housing and with tubular portion 42b extending centrally and forwardly within the bore portion 40k. An O-ring 48 seals flange portion 42a with respect to the cylinder housing and a snap ring 50 suitably received in an annular groove in the cylinder housing precludes rearward movement of the annular member 42 relative to the cylinder housing.

An annular pressure chamber 52 is defined between the outer periphery of guide member tubular portion 42b and cylinder bore portion 40k and inlet port 40h and bleed port 40i open into annular pressure chamber 52.

Piston 44 includes a forward portion 44a and an enlarged diameter annular rearward portion 44b. Forward portion 44a includes a blind bore 44c opening at the forward end of forward portion 44a and a blind bore 44d opening at the rear end of forward portion 44a. Annular portion 44b is sized to slidably guide at its inner periphery on the outer periphery of guide member tubular portion 42b and includes a flange portion 44e at its rearward end slidably engaging bore portion 40k. An annular seal 54 is positioned in pressure chamber 52 between piston flange portion 44e and an annular shoulder 42c defined on the outer periphery of guide member tubular portion 42b proximate flange portion 42a.

Master cylinder assembly 34 is of the center feed type and includes a cup-shaped retainer member 56 secured to the forward end of piston forward portion 44a, a further cup-shaped retainer member 58 positioned against end wall 40e of the cylinder housing in surrounding relation to reservoir port 40d, and a valving rod 60 positioned centrally within bore portion 40j and including a head portion 60a snappingly received between spring finger portions 56a of retainer 56 and a valve portion 60b positioned within retainer 58 and carrying a resilient bullet-nose member 62 for sealing coaction with reservoir port 40d.

A coil spring 64 extends between retainer 58 and retainer 56 to urge the piston rearwardly within the cylinder housing and an annular seal 66 is provided on the forward end of the piston in a groove defined between the rear face of retainer 56 and a shoulder 44f defined proximate the forward end of the piston. A further spring 67 is positioned within retainer 58 and acts between the retainer forward end wall and a collar portion of the valving member valve portion 60b. Further details of the structure and operation of the center feed valving mechanism of master cylinder assembly 34 are disclosed in co-pending U.S. patent application Ser. No. 049,133, filed May 12, 1987 and assigned to the assignee of the present invention.

Pushrod 46 includes an eye portion 46a at its rearward end for pivotal connection in known manner to clutch pedal 14 and extends at its forward end 46b into the open rearward end of the cylinder housing and through the annular guide member 42 for pushing engagement at its forward end 46c against the blind end 44g of blind bore 44d. A boot 68 carried on the rear end of the cylinder housing sealingly engages pushrod 46 to preclude the entry of contaminants into the bore of the master cylinder assembly.

Power assembly 35 includes an electric motor 70, a hydraulic pump 72 driven by motor 70, a reservoir 74, an accumulator 76, and a solenoid valve 78 for selectively controlling the discharge of pressurized fluid from the power assembly 35.

Power assembly 35 includes an internal control system whereby motor 70 is operated intermittently to maintain a desired predetermined pressure of hydraulic fluid in accumulator 76.

Control module 36 is of known form and preferably includes a programmable logic array or a gate array.

Mode selector switch 37 is positioned in the passenger compartment of the motor vehicle, preferably proximate the gear shift lever 33, and is movable between an off or disenabling position, shown in solid lines in FIG. 1, and an on or enabling position, shown in dash lines in FIG. 1.

Slave cylinder 38 is mounted to manual gearbox 32 by a bracket 80 and includes an output rod 82 connected pivotally to the free upper end of clutch release lever 26.

Throttle control assembly 39 functions at all times, in cooperation with control module 36, to provide electronic control of the position of the engine throttle plate 92 in accordance with the position of accelerator pedal 82 and additionally, with mode selector switch 37 in the power or enable mode, functions in cooperation with control module 36 to automatically control the throttle plate position and thereby engine speed during disengagement and subsequent engagement of the clutch. Throttle control assembly 39 includes accelerator pedal 82, a proportional potentiometer 84 associated with accelerator pedal 82, an electric servomotor 90 drivingly connected to the throttle plate 92 of the engine throttle 20, and a throttle plate position sensor 94.

The invention dual mold clutch control system is intended for installation in the associated motor vehicle during the original motor vehicle assembly process. Specifically, master cylinder assembly 34 is secured to the firewall 12 of the vehicle by the use of suitable fastener members passing through cylinder housing flange portion 40c and firewall 12; pushrod 46 is pivotally secured to clutch pedal 14; a conduit 96 is installed between a reservoir fitting 40l of the master cylinder housing and a suitable reservoir 98 positioned remotely from the hydraulic cylinder assembly within the motor vehicle engine compartment; power assembly 35 is positioned within the motor vehicle engine compartment and a conduit 100 is provided between the output of the power assembly 35, as controlled by the solenoid valve 78, and the inlet port 40h of the hydraulic cylinder assembly; slave cylinder 38 is mounted to gearbox 32 by bracket 80 with output rod 82 connected to clutch release lever 26; a conduit 102 is provided between the discharge port 40f of the hydraulic cylinder assembly and the inlet port of the slave cylinder assembly 38; a lead 104 is provided between solenoid valve 78 and control module 36; a further lead 106 is provided between mode selector switch 37 and control module 36; further leads 108 and 110 are provided between control module 36 and position sensing switches 112 associated with gear shift lever 33; a further lead 114 is provided between control module 36 and a switch 116 mounted on shift knob 118 of shift lever 33; a further lead 120 is provided between control module 36 and a gearbox output speed sensor 122; a further lead 123 is provided between control module 36 and an engine speed sensor 124; a further lead 126 is provided between control module 36 and potentiometer 84; a further lead 128 is provided between control module 36 and servomotor 90; and a further lead 130 is provided between control module 36 and position sensor 94. Knob 118 has a lost motion connection with lever 33 and switch 116 senses the relative, lost motion movement between knob 118 and lever 33.

In the operation of the dual mode clutch control system of the FIGS. 1 and 2 embodiment, the vehicle operator at all times has the choice between engaging and disengaging the clutch in a manual manner by use of the clutch pedal 14 or providing power engagement and disengagement of the clutch in response to shifting movement of gearshift lever 33.

Specifically, with the mode selector switch 37 in the solid line or off position, the control module 36 functions to disenable the power assembly 35 and the clutch is engaged and disengaged in the usual manual manner by depression of the clutch pedal 14 with the pushrod 46 pushing against the blind end of the blind bore 44d in the piston 44 to move the piston forwardly or to the left as viewed in FIG. 2 down the bore of the housing of the master cylinder to suitably discharge fluid through discharge port 40f for delivery through conduit 102 to slave cylinder 38 to extend slave cylinder output rod 82 and pivot clutch release lever 26 in a manner to move release bearing 24 forwardly in a clutch disengaging direction.

As the piston 44 is moved forwardly by the pushrod 46, bullet-nose 62 moves forwardly into sealing engagement with discharge port 40d in known manner to isolate the reservoir 98 from the bore of the hydraulic cylinder and facilitate the discharge of pressure fluid through the discharge port 40f. During this manual mode forward movement of the piston 44, seal 54 remains in the position seen in FIG. 2 so that the flange portion 44e of the piston moves away from the seal with the extent of forward movement of the piston being delimited by engagement of the shoulder 44m on the piston with the shoulder 40j defined at the juncture of bore portions 40j and 40k. As the clutch pedal is released by the operator, the system returns to the clutch engaged position under the influence of the clutch diaphragm fingers and under the influence of the return spring 64 in the master cylinder assembly.

When the operator desires to provide power operation of the clutch, the mode selector switch 37 is moved to the dash line or enable position of FIG. 1 in which control module 36 is appropriately enabled or signaled via lead 106 to enable the power assembly 35. Specifically, as the shift knob 118 is grasped by the operator to initiate a gear shifting movement of lever 33 and thereby a shifting of gearbox 32, limited lost motion movement occurs between knob 118 and lever 33 and this lost motion is sensed by switch 116 which closes to send an appropriate control signal via lead 114 to control module 36 to indicate that the operator is initiating a gear shifting action. Control module 36 acts appropriately via lead 104 to open solenoid valve 78 and allow the delivery of pressurized fluid through conduit 100 from power assembly 35 to master cylinder assembly 34. The pressurized fluid arriving at the master cylinder assembly 34 via conduit 100 enters the annular pressure chamber 52 and acts against seal 54 to move the seal and the piston 44 forwardly, or to the left as viewed in FIG. 2, down the bore of the cylinder housing to discharge pressurized fluid from the cylinder housing via the conduit 102 and operate the release lever 26 of the clutch via the slave cylinder 38 in the manner described with respect to the manual operation of the clutch.

As the piston is moved down the bore of the cylinder housing by the pressure acting in annular chamber 52, the piston moves away from the pushrod 46 and the bullet-nose 62 of the valving assembly moves into sealing engagement with discharge port 40d to isolate the reservoir from the bore of the cylinder housing and facilitate the delivery of pressurized fluid through conduit 102 to the slave cylinder. After the pistons in the master and the slave cylinders have been moved through a distance corresponding to the distance required to disengage the clutch, a signal is sent from a travel sensor 132 secured to the rear end of slave cylinder 38 to control module 36 via a lead 134 to indicate that the clutch has been moved to its fully disengaged position, whereupon control module 36 functions via lead 104 to close solenoid valve 78 and terminate delivery of pressurized fluid to master cylinder assembly 34 from power assembly 35 while maintaining pressurized fluid in chamber 52 and thereby maintaining the master cylinder and slave cylinder pistons in their clutch disengaging positions.

Initiation of a gear shifting movement by the operator as sensed by switch 116 also functions via control module 36 to take control of the throttle plate 92 away from the operator. Specifically, whereas throttle plate 92, whether in the manual or power mode, is normally controlled by the operator by accelerator pedal 82, lead 126, control module 36, lead 128, and servomotor 90, when a shift is initiated as signaled by the closing of switch 116, the accelerator pedal 82 is disenabled and control of engine speed is assumed by module 36. Specifically, module 36 looks at the throttle plate position, engine speed, and gearbox output speeds being provided to it respectively by leads 130, 123 and 120 and functions as the clutch is disengaged to reduce engine speed to a relatively low synchronizing value to prevent engine flare.

Following arrival of shift lever 33 at its new position corresponding to the desired new shift position of gearbox 32, position sensing switches 112 sense this arrival and send appropriate signals to control module 36 via leads 108, 110 to indicate that the shifting of the gearbox has been completed, whereupon module 36 sends a signal via lead 104 to solenoid valve 78 to move the valve to a position in which it provides communication from line 100 through the valve to reservoir 74 so that line 100 and thereby chamber 52 of the master cylinder are dumped to atmospheric pressure to allow the diaphragm spring fingers of the clutch and master cylinder return spring 64 to return the slave cylinder and master cylinder to the clutch engage position.

As the clutch is thus allowed to reengage, module 36 continues to control the position of throttle plate 92 based on inputs from leads 130, 123 and 120 and, specifically, gradually increases engine speed to provide a smooth synchronized reengagement of the clutch. Following full reengagement of the clutch, control of the throttle is returned to the operator so that the operator may again determine engine speed by appropriate positioning of accelerator pedal 82.

Figure 3:
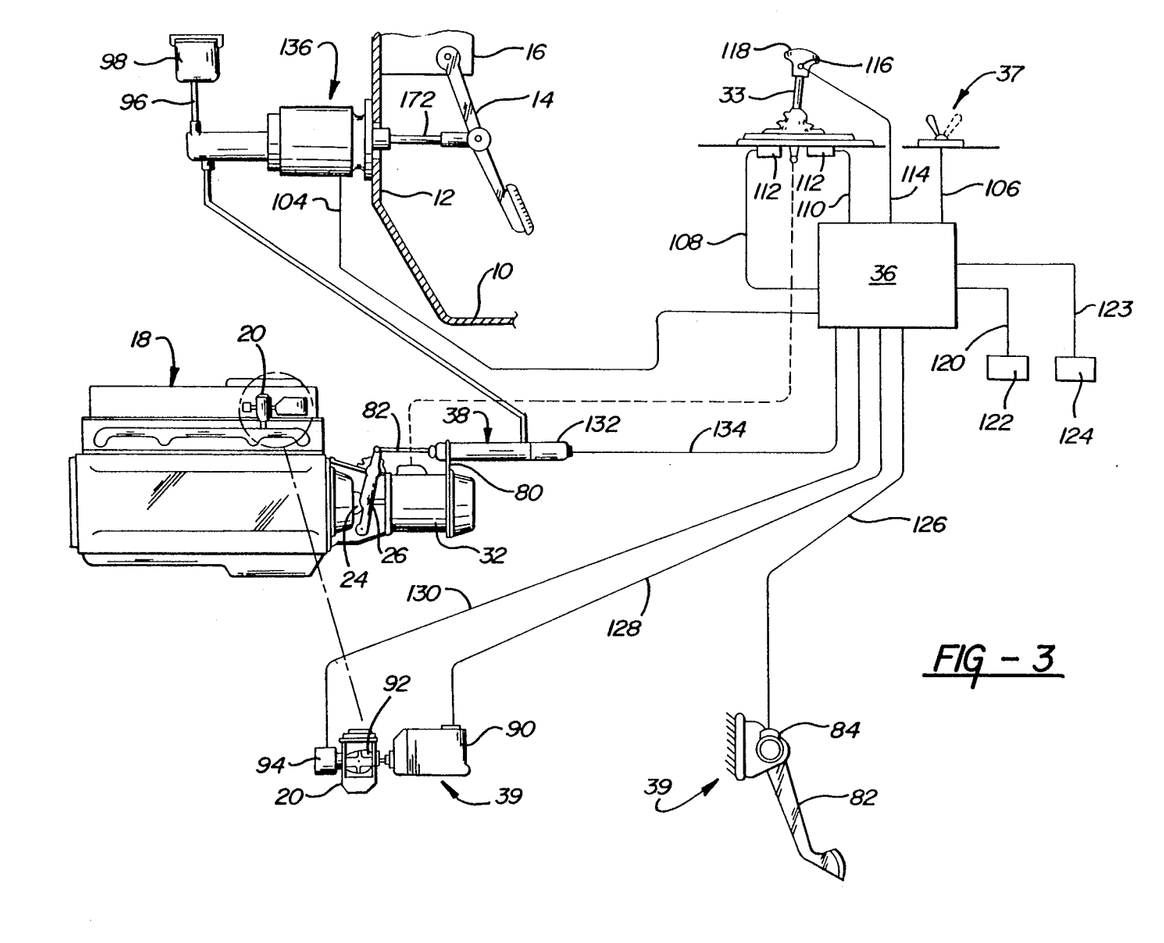
FIG. 3 is a schematic view of a second embodiment of the invention dual mode clutch control system.
Figure 4:
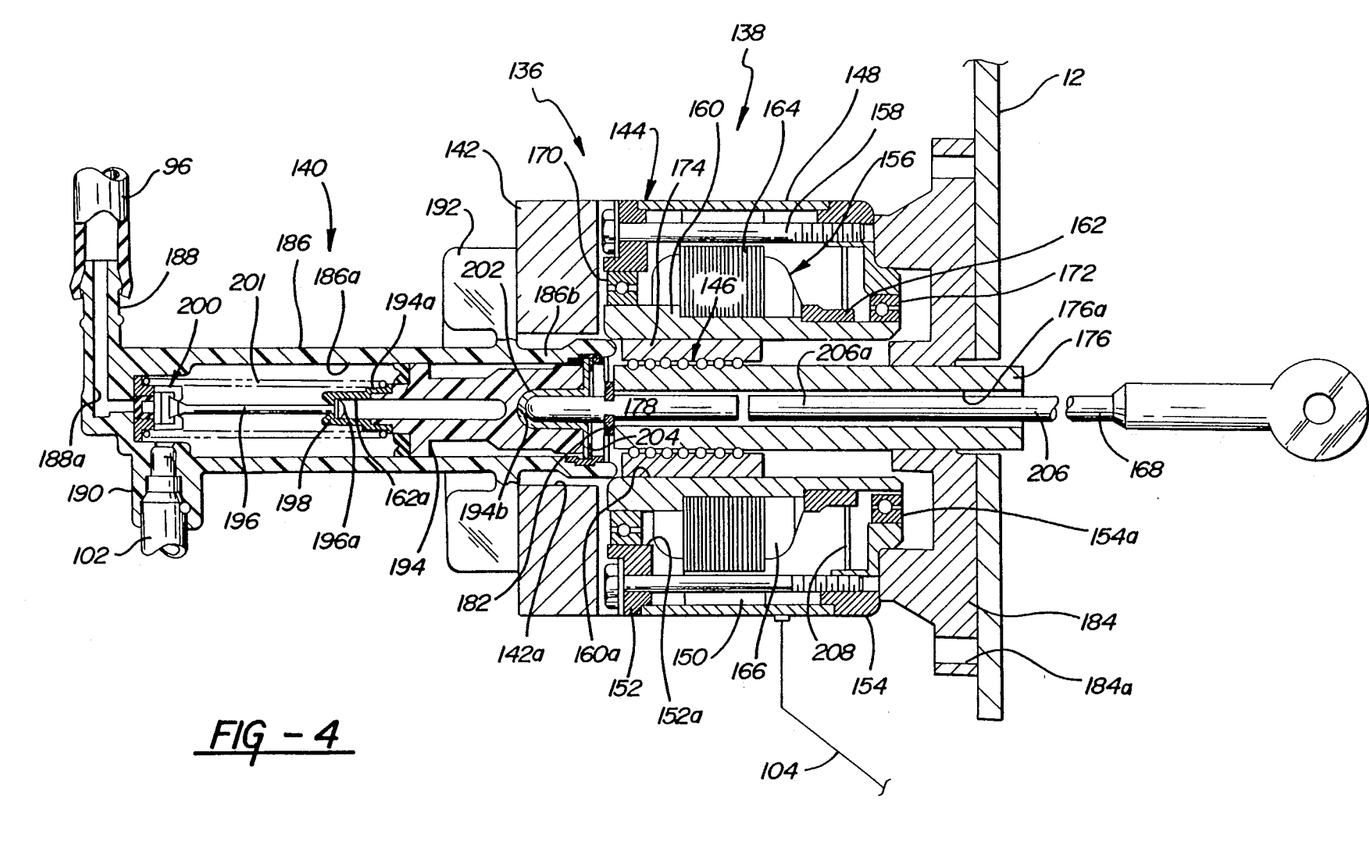
FIG. 4 is a detailed view of an electric master cylinder assembly utilized in the system of FIG. 3.

The dual mode clutch control system of the FIGS. 3 and 4 embodiment shares many elements in common with the FIGS. 1 and 2 and, specifically, includes a control module 36; a mode select switch 37 movable between a solid line off/disenable position and a dash line on/enable position and connected to control module 36 by a lead 106; a gear shift lever 33 for shifting the gearbox 32 and including position sensing switches 112 coacting with leads 108, 110 to provide a signal to control module 36 indicative of the shift position of the gear shift lever; a gear knob 118 carrying a lost motion switch 116 connected to module 36 by a lead 114 and operative to indicate shift initiating lost motion between knob 118 and lever 33; a slave cylinder 38 connected to the gearbox 32 by a bracket 80 and including an output rod 82 connected to the upper end of clutch release lever 26; a travel sensor 132 secured to the slave cylinder and connected to control module 36 by a lead 134; a fluid conduit 102 connected at its lower end to the input of the slave cylinder assembly; a reservoir 98 and a conduit 96 extending from the reservoir 98; leads 120, 123, 128, and 130 respectively connecting control module 36 to a gear box output speed sensor 122, an engine speed sensor 124, a throttle servo motor 90, and a throttle position sensor 94; and an output lead 104 extending from control module 36 for appropriate control of the power mechanism of the FIGS. 3 and 4 embodiment.

In the FIGS. 3 and 4 embodiment, the power assembly 35 and master cylinder assembly 34 of the FIGS. 1 and 2 embodiment are replaced by a master cylinder assembly 136 seen in detail in FIG. 4.

Master cylinder assembly 136 includes an electric motor assembly 138, a cylinder assembly 140, and an adaptor plate 142.

Electric motor assembly 138 includes an electric motor 144 and drive means 146.

Motor 144 includes an annular housing 148, a pair of arcuate magnets 150 positioned in circumferentially spaced relation within housing 148, an annular front end cap 152, a rear end cap 154, and an armature assembly 156. Annular housing 148 is clamped between end caps 152 and 154 by tie bolts 158 passing between circumferential gaps between the magnets 150. Armature assembly 156 includes a tubular armature 160, a commutator 162 positioned concentrically around armature 160, laminations 164 positioned concentrically around armature 160, and windings 166. Armature assembly 156 is mounted within the electric motor housing for rotation about the central axis 168 of the master cylinder assembly by a ball bearing 170 positioned in an annular opening 152a in end cap 152 and by a further ball bearing 172 positioned in an annular opening 154a in end cap 154.

Drive means 146 is of the ball screw type and includes a ball nut 174, a ball screw 176, and a pushrod 178. Ball nut 174 is fixedly secured within the tubular bore 160a of armature 160 generally concentrically within laminations 164, and drives ball screw 176 through a series of bearing balls 180. Ball nut 174 and ball screw 176 may for example be of the internal ball return type wherein, after each turn, the balls are fed back to the preceding turn by a floating liner situated inside the nut.

Ball screw 176 is tubular to define a tubular bore 176a and a snap ring 182 is provided on pushrod 178 for pushing engagement by the forward leading end of ball screw 176.

Electric motor 144 further includes a firewall mounting plate 184 suitably secured to end cap 154 and defining a series of circumferentially spaced mounting holes 184a for suitably mounting the motor assembly to the firewall 12 of the vehicle.

Further details of electric motor assembly 138 are disclosed in co-pending U.S. patent application Ser. No. 111,294 filed on Oct. 22, 1987 and assigned to the assignee of the present invention.

Cylinder assembly 140 is of the center feed type and includes a tubular main body housing 186 defining an elongated bore 186a, a reservoir inlet fitting 188 defining a reservoir port 188a, a discharge fitting 190, and a flange 192; a piston 194; a valve stem 196; a valve stem retainer 198; a valve assembly 200; and a return spring 201. Main body housing 186, reservoir inlet fitting 188, discharge fitting 190, and flange 192 are formed as a single integrally molded plastic member. Piston 194 is also formed of plastic and is slidably received in bore 186a.

Valve stem retainer 198 is secured to the front end of nose 194a of piston 194 and snappingly receives the rearward end 196a of valve stem 196. Valve assembly 200 is mounted on the other, forward end of valve stem 196 and coacts with reservoir port 188a to establish communication between the reservoir and bore 186a with the piston in the retracted position seen in FIG. 4 and to block communication between reservoir port 188a and bore 186a in response to leftward or actuating movement of the piston linearly within the bore 186a. Further details of the manner in which valve stem retainer 198 coacts with valve stem 196 as well as further details of the manner in which valve assembly 200 operates to open and close communication between reservoir port 188a and bore 186a in response to linear movement of piston 194 within bore 186a are disclosed in co-pending U.S. patent application Ser. No. 049,133.

Adapter plate 142 includes a central aperture 142a for passage of the rearward portion 186b of cylinder main body housing 186. Adapter plate 142 is suitably secured to and interposed between electric motor assembly 138 and cylinder assembly 140 so as to provide a rigid interconnection between the two assemblies. In the assembled condition of the electric motor assembly 138 and the cylinder assembly 140, the forward end of pushrod 178 is received in an annular insert 202 which is in turn received in a blind bore or socket 194b formed in the rearward end of the piston. A split ring 204 positioned in the open rear end of the housing 186 engages insert 202 to preclude rearward movement of the piston out of the housing bore 186a.

The dual mold clutch control system of the FIGS. 3 and 4 embodiment is preferably installed in the associated motor vehicle during the original motor vehicle assembly process. Specifically, master cylinder assembly 136 is secured to the engine side of the firewall 12 utilizing mounting holes 184a in mounting plate 184; a pushrod 206 is pivotally secured at its rearward end to clutch pedal 14 and extends at its forward end into the bore 176a of annular screw 176 to position its forward end 206a in juxtaposition to the rearward end of pushrod 178; conduit 96 is secured at its lower end to reservoir fitting 188; conduit 102 is secured at its upper end to discharge fitting 190; and lead 104 from control module 36 is suitably electrically connected to the brushes 208 of electric motor 144.

As with the dual mold clutch control system of the FIGS. 1 and 2 embodiment, the operator in the FIGS. 3 and 4 embodiment at all times has a choice of operating the clutch manually or providing power operation of the clutch. Specifically, with the mode select switch 37 in the forward or disenable position, clutch engagement and disengagement is accomplished in the normal manner by pivotal depression of clutch pedal 14 which acts through pushrod 206 and pushrod 178 to advance the piston 194 in the bore 188a to allow valve assembly 200 to isolate reservoir 98 from the bore 188a and to provide a discharge of pressurized fluid through fitting 190 for delivery through conduit 102 to slave cylinder 38 to extend pushrod 82 and move the clutch release lever 26 in a direction to move release bearing 24 in a clutch disengage direction. Following release of the clutch pedal by the operator, the diaphragm fingers of the clutch operate in known manner and in cooperation with return spring 201 to return the slave cylinder and master cylinder to the clutch engage position seen in FIG. 4.

When the operator desires to provide power operation of the clutch, mode switch 37 is moved to the dash line or enable position. In the enable position of switch 37, when the operator grasps switch knob 118 to initiate a gear shifting movement of lever 33, control module 36 functions in response to sensed lost motion between knob 118 and lever 33, as communicated to the control module via switch 116 and lead 114, to send an actuating signal via lead 104 to master cylinder assembly 136. Specifically, when the operator grasps knob 118 to initiate a shifting movement of lever 33, electric power is suitably delivered to armature assembly 156 via lead 104 and brushes 208 to cause the armature assembly to rotate in known manner. As the armature assembly rotates, ball nut 172 is rotated to move ball screw 176 linearly and thereby correspondingly move piston 194 linearly within bore 186 of cylinder housing 186. Pushrod 206 does not move during this procedure but rather remains in the position illustrated in FIG. 4 so that the pushrod 178 moves forwardly away from the end 206a of pushrod 206 as the piston 194 is moved forwardly down the bore 186a to deliver pressurized fluid through conduit 102 to slave cylinder 38 to disengage the clutch.

As in the FIGS. 1 and 2 embodiment, the travel sensor 132 connected to the rear end of slave cylinder 38 functions to measure the movement of the pushrod 82 of the slave cylinder and, following forward movement of the pushrod a predetermined amount corresponding to clutch disengagement, functions to transmit a signal via lead 134 to control module 36 which in turn signals the electric motor via lead 104 to deenergize the motor and terminate clutch disengaging movement of push rod 82. Following arrival of shift lever 33 in its new shift position corresponding to the desired new shift position of gearbox 32, as determined by position sensing switches 112 and as communicated to module 36 via leads 108, 110, module 36 functions to send a signal to the motor via lead 104 in a sense to reverse the direction of rotation of the motor so that nut 174 now functions to move screw 176 rearwardly or to the right as viewed in FIG. 4 to allow the piston 194 to be returned under the influence of the diaphragm fingers of the clutch and return spring 201 to the engaged position seen in FIG. 4.

As the piston 194 returns to the clutch engage position of FIG. 4, valve assembly 200 operates in known manner to restore fluid communication through reservoir port 188a between the bore 186a of the cylinder and the reservoir 98.

As with the FIGS. 1 and 2 embodiment, throttle control assembly 39 functions at all times in cooperation with control module 36 to provide electronic control of the position of the engine throttle plate 92 in accordance with the position of accelerator pedal 82 and additionally, with mode selector switch 37 in the power or enable mode, functions in cooperation with control module 36 to automatically control throttle position and thereby engine speed during disengagement and subsequent engagement of the clutch. Specifically, upon the initiation of a gear shifting movement as sensed by switch 116, the accelerator pedal is disenabled to take control of the throttle away from the operator and the control module 36 looks at the throttle plate position, engine speed, and gearbox output speed signals being provided to it respectively via leads 130, 123 and 120 and functions as the clutch is disengaged to reduce engine speed to a relatively low synchronizing value to prevent engine flare and thereafter, during clutch reengagement, functions to gradually increase engine speed to provide a fully synchronized smooth engagement of the clutch whereafter, following full reengagement of the clutch, control of the throttle is returned to the operator so that the operator may again determine engine speed by appropriate positioning of accelerator pedal 82.

The dual mode clutch control systems of the invention will be seen to provide efficient, ready and convenient means of retaining the fuel economy and driver control aspects of a manual transmission while providing the operator, at his option, the convenience aspects of an automatically shifted clutch.

Whereas preferred embodiments of the invention have been illustrated and described in detail, it will be apparent that various changes may be made in the disclosed embodiments without departing from the scope or spirit of the invention.

We claim:

1. A control system for a motor vehicle of the type including a clutch, a clutch pedal and a manual gearbox having a plurality of shift positions, said system comprising:
   a gear shift assembly including a gear shift member movable by a vehicle operator between a plurality of shift positions corresponding to the shift positions of the gear box;
   manual mode means operative in response to operation of the clutch pedal to actuate the clutch;
   power mode means operative when enabled to actuate the clutch in response to movement of said gear shift member;
   control means operative to sense the position of the gear shift assembly and operative when enabled to enable said power mode means; and
   mode selector means movable by the vehicle operator between a first position in which said control means is enabled and a second position in which said control means is disenabled.

2. A control system according to claim 1 wherein:
   said control means is further operative to sense the initiation of a gear changing movement of said gear shift assembly; and
   said system is operative with said mode selector means in said first position to disengage the clutch upon the initiation of a gear changing movement of said gear shift assembly as sensed by said control means and to reengage the clutch upon the completion of the gear changing movement of the gear shift assembly as sensed by said control means.

3. A control system according to claim 2 wherein:
   said control means comprises a logic module electrically connected to said gear shift assembly, said mode selector means, and said power mode means.

4. A control system according to claim 3 wherein:
   the electrical connection of said logic module to said gear shift assembly includes first means for sensing the initiation of a gear shifting movement of said gear shift assembly and second means operative to sense said completion of the gear shifting movement of the gear shift assembly.

5. A control system according to claim 4 wherein:
   said gear shift member is a gear shift lever;
   said gear shift assembly further includes a shift knob having a lost motion connection with said shift lever; and
   said first means includes means sensing lost motion movement between said shift lever and said shift knob occurring upon the initiation of a gear shifting movement of said gear shift assembly.

6. A control system according to claim 1 wherein the vehicle further includes an accelerator pedal and a throttle plate for controlling the delivery of fuel to the engine of the vehicle and wherein said system further includes:
   throttle control means operative with said mode selector mans in said first position to control the position of the throttle valve irrespective of the position of the accelerator pedal.

7. A control system according to claim 6 wherein:
   said throttle control means includes means sensing the position of the throttle plate and power means operative to move the throttle plate.

8. A control system according to claim 7 wherein:
   said system includes a control module and means for sensing the position of the gear shifter assembly; and
   said control module is operative with said mode selector means in its first position to selectively control said power means, and thereby the position of the throttle plate, in accordance with the sensed position of the throttle plate and the sensed position of the gear shifter assembly.

9. A control system for a motor vehicle of the type including a clutch, a clutch pedal, a manual gear box having a plurality of shift positions, and a gear shift assembly having a plurality of shift positions corresponding to the shift positions of the gear box, said system comprising:
   a master cylinder assembly including a cylinder housing defining an axially extending bore and a piston reciprocally movable in said bore to output pressure fluid from said bore;
   a slave cylinder assembly receiving the output of said master cylinder assembly and including an output member adapted to be connected to the clutch so as to be operative to engage and disengage the clutch in responsive to reciprocal movement of said piston in said bore;
   push rod means adapted to be connected at one end thereof to the clutch pedal and extending at its other end into said bore for driving engagement with said piston so as to move said piston in said bore in response to operation of the clutch pedal;
   power mode means operative when enabled to move said piston in said bore independently of the operation of the clutch pedal; and
   mode selector means movable by the vehicle operator between a first position in which said power mode means is enabled and a second position in which said power mode means is disenabled.

10. A control system according to claim 9 wherein:
    said power mode means comprises an electric motor assembly having an output shaft drivingly connected to said piston.

11. A control system according to claim 10 wherein:
    said output shaft is axially movable in response to energization of said motor and operates to move said piston axially in said bore.

12. A control system according to claim 11 wherein:
    said output shaft comprises a screw driven by a nut secured to the armature of said electric motor assembly.

13. A control system according to claim 9 wherein:
    said power mode means comprises a source of pressurized fluid and delivery means operative to deliver pressurized fluid from said source to said master cylinder assembly in response to movement of the gear shift assembly with said mode selector means in said first position.

14. A control system according to claim 13 wherein:
    said source of pressurized fluid includes a motor, a pump driven by said motor, and an accumulator for storing pressurized fluid; and
    said delivery means includes valve means movable between open and closed positions in response to movement of the gear shift assembly with said mode selector means in said first position.

15. A control system for a motor vehicle of the type including a clutch, a clutch pedal, and a manual gear box having a plurality of shift positions, said system comprising:

a gear shifter assembly having a plurality of shift positions corresponding to the shift positions of the gear box and operative in response to movement of the gear shifter assembly to its various shift positions to shift the gearbox into its respective shift positions without power assist;

manual mode means operative in response to operation of the clutch pedal to actuate the clutch without power assist; and power mode means operative in response to initiation of a gear changing movement of the gear shifter assembly to disengage the clutch with power assist and operative in response to completion of the gear changing movement of the gear shifter assembly to reengage the clutch.

16. A control system according to claim 15 wherein said system further includes:

mode selector means movable by the vehicle operator between a first position in which said power mode means is enabled and a second position in which said power mode means is disenabled.

17. A control system according to claim 16 wherein:

said system further includes a logic module electrically connected to said power mode means, the gear shifter assembly, and said mode selector means; and said logic module is operative in response to the initiation of a gear changing movement of the gear shifter assembly to signal said power mode means in a sense to disengage the clutch and its operative in response to the sensed completion of the gear changing movement of the gear shifter assembly to signal said power mode means in a sense to reengage the clutch.

18. A control system for use with a motor vehicle of the type including a clutch, a clutch pedal, a manual gear box having a plurality of shift positions and a gear shift assembly having a plurality of shift positions corresponding to the shift positions of the gear box, said system being of the type including manual mode means operative in response to operation of the clutch pedal to actuate the clutch, power mode means operative when enabled to actuate the clutch, and mode selector means operable independently of said gear shift assembly and movable by a vehicle operator between a first position in which said power mode means is enabled and a second position in which said power mode means is disenabled; characterized in that with said mode selector means in said first position so as to enable said power mode means, said power mode means is operative in response to initiation of a gear shifting movement of the gear shifter assembly to disengage the clutch and is operative in response to completion of the gear shifting movement of the gear shifter assembly to reengage the clutch.

19. A control system for use with a motor vehicle of the type including a clutch, a clutch pedal, a manual gear box having a plurality of shift positions and a gear shift assembly having a plurality of shift positions corresponding to the shift positions of the gear box, said system being of the type including a master cylinder assembly including a cylinder housing defining an axially extending bore and a piston reciprocally movable in said bore to output pressure fluid from said bore, a slave cylinder assembly receiving the output of said master cylinder assembly and including an output master adapted to be connected to the clutch so as to be operative to engage and disengage the clutch in response to reciprocal movement of said piston in said bore, and push rod means adapted to be connected at one end thereof to the clutch pedal and extending at its other end into said bore for driving engagement with said piston so as to move said piston in said bore in response to operation of the clutch pedal; characterized in that said system further includes means operative to move said piston in said bore independently of the operation of the clutch pedal so as to engage and disengage the clutch independently of the operation of the clutch pedal.

20. A master cylinder assembly for use with a control pedal of a motor vehicle, said assembly comprising:

a cylinder defining a bore having a discharge port;

a piston mounted in said bore, coacting with said bore to define a pressure chamber communicating with said discharge port, and operative in response to axial movement thereof in said bore to discharge pressurized fluid from said pressure chamber through said discharge port;

an actuator member mounted for axial movement relative to said piston and operative in response to axial movement thereof to apply a force to said piston to move said piston in said bore to discharge pressurized fluid from said pressure chamber;

power drive means operative when actuated to move said actuator member axially and thereby apply a force to said piston; and a pushrod adapted to be connected at one end thereof to a control pedal of the vehicle and operative in response to axial movement thereof upon movement of the control pedal to directly engage said piston and apply a force to said piston to move said piston in said bore to discharge pressurized fluid from said pressure chamber.

21. A control system for a motor vehicle of the type including a clutch, a clutch pedal, a manual gearbox having a plurality of shift positions, and a gear shift assembly having a plurality of shift positions corresponding to the shift positions of the gearbox, said system comprising:

manual mode means operative in response to operation of the clutch pedal to actuate the clutch;

power mode means operative when enabled to actuate the clutch in response to movement of the gear shift assembly;

control means operative to sense the position of the gear shift assembly and operative when enabled to enable said power mode means; and mode selector means movable by a vehicle operator between a first position in which said control means is enabled and a second position in which said control means is disenabled;

said manual mode means including a hydraulic cylinder assembly, including a cylinder housing defining an axially extending bore and a piston reciprocally movable in said bore in response to movement of the clutch pedal, and a slave cylinder assembly receiving the output of said master cylinder assembly and including an output member adapted to be connected to the clutch so as to be operative to engage and disengage the clutch in response to reciprocal movement of said piston in said bore;

said power mode means including means for moving said piston reciprocally in said bore independently of the movement thereof in response to operation of the clutch pedal.

22. A control system according to claim 21 wherein said manual mode means includes a rod member adapted to be driven at one end thereof in response to operation of the clutch pedal and extending at its other end into said bore for driving engagement with said piston.

23. A control system according to claim 22 wherein:
said piston includes a central blind bore at one end thereof; and
said other end of said rod member extends into said blind bore.

24. A control system according to claim 22 wherein:
the driving engagement of said other end of said rod with said piston is a pushing engagement and said piston is free to move in said bore away from said other end of said rod member in response to operator movement of the gear shift assembly with said mode selector means in said first position.

25. A control system according to claim 24 wherein:
said manual mode means includes a rod member adapted to be connected at one end thereof to the clutch pedal and extending at its other end into said bore for driving engagement with a central portion of said piston;
said piston defines an annular surface in surrounding relation to said central portion;
said hydraulic master cylinder assembly further defines an annular pressure chamber in communication with said annular piston surface; and
said delivery means delivers pressurized fluid to said annular chamber for action against said annular piston surface.

26. A control system according to claim 25 wherein:
said hydraulic master cylinder assembly includes an annular member positioned within said bore;
said annular pressure chamber is defined between the outer periphery of said annular member and said bore;
said piston includes an annular portion at one end thereof slidably mounted at its inner periphery on the outer periphery of said annular member; and
said piston annular surface is defined by the free end of said piston annular portion.

27. A control system according to claim 26 wherein:
said rod member extends through said annular member for engagement with said piston.

28. A control system according to claim 24 wherein:
said power mode means includes an electric motor assembly including an electric motor and drive means drivingly connecting said motor to said piston.

29. A control system according to claim 28 wherein:
said motor includes an annular armature; and
said drive means includes a nut driven by said armature and a screw driven by said nut.

30. A control system according to claim 28 wherein:
said motor assembly is mounted to said cylinder housing with the central output axis of said motor coaxial with the axis of said bore.

31. A control system according to claim 30 wherein:
said motor includes an annular armature; and
said drive means includes a nut positioned within said annular armature and a screw positioned within said nut and rotationally restrained so that rotation of said armature upon energization of said motor produces axial movement of said screw.

32. A control system according to claim 31 wherein:
said screw is annular; and
said manual mode means includes a rod member positioned at least in part within said screw and adapted to be driven by said screw in response to energization of said motor, adapted to be driven at one end thereof in response to operation of the clutch pedal, and extending at its other end into said bore for driving engagement with said piston.

33. A control system according to claim 32 wherein:
said one end of said rod member is positioned within said screw; and
said manual mode means further includes a push rod adapted to be connected at one end thereof to the clutch pedal and extending at its other end into said screw into juxtaposition with said one end of said rod member.

* * * * *